United States Patent [19]
Sitabkhan

[11] 3,946,175
[45] Mar. 23, 1976

[54] MAGNETIC PRESSURE INDICATOR FOR A CONTAINER

[75] Inventor: Abdul N. Sitabkhan, Monrovia, Calif.

[73] Assignee: HTL Industries, Inc., Pasadena, Calif.

[22] Filed: Dec. 3, 1973

[21] Appl. No.: 421,152

[52] U.S. Cl............ 200/83 L; 200/83 C; 340/240; 73/410; 337/321
[51] Int. Cl.² ...................................... H01H 35/32
[58] Field of Search .... 200/83 R, 83 C, 83 D, 83 L, 200/81.9 M; 337/321; 335/205; 73/40, 410; 340/240, 242

[56] References Cited
UNITED STATES PATENTS

| | | | |
|---|---|---|---|
| 3,042,771 | 7/1962 | Oliveay | 200/83 L |
| 3,046,369 | 7/1962 | Hicks | 200/83 C |
| 3,206,572 | 9/1965 | Buehler | 200/83 L |
| 3,342,959 | 9/1967 | Breunich | 200/83 L |
| 3,576,412 | 4/1971 | Davin | 200/83 R |
| 3,735,376 | 5/1973 | Kermer | 200/83 R |

*Primary Examiner*—Gerald P. Tolin
*Attorney, Agent, or Firm*—Jackson & Jones Law Corporation

[57] ABSTRACT

A temperature compensated pressure indicator adapted to be mounted within a pressure container includes a reservoir housing and housing member welded together to form a secondary pressure chamber. A bellows member is hermetically mounted within the secondary pressure chamber and communicates with the exterior pressure of the container. Mounted on the bellows member is a movable magnetic member adapted to slide on a hollow guide post as a result of any pressure differentials. A reed switch assembly is held stationary in the guide post by a pair of band springs. The switch assembly is electrically connected to a source of power and an external indicator such as a light. When the bellows member moves the magnetic member close to the switch assembly due to a pressure differential, the magnetic field closes the switch assembly to activate the light. The indicator is substantially non-responsive to wide variations in the ambient temperature.

5 Claims, 3 Drawing Figures

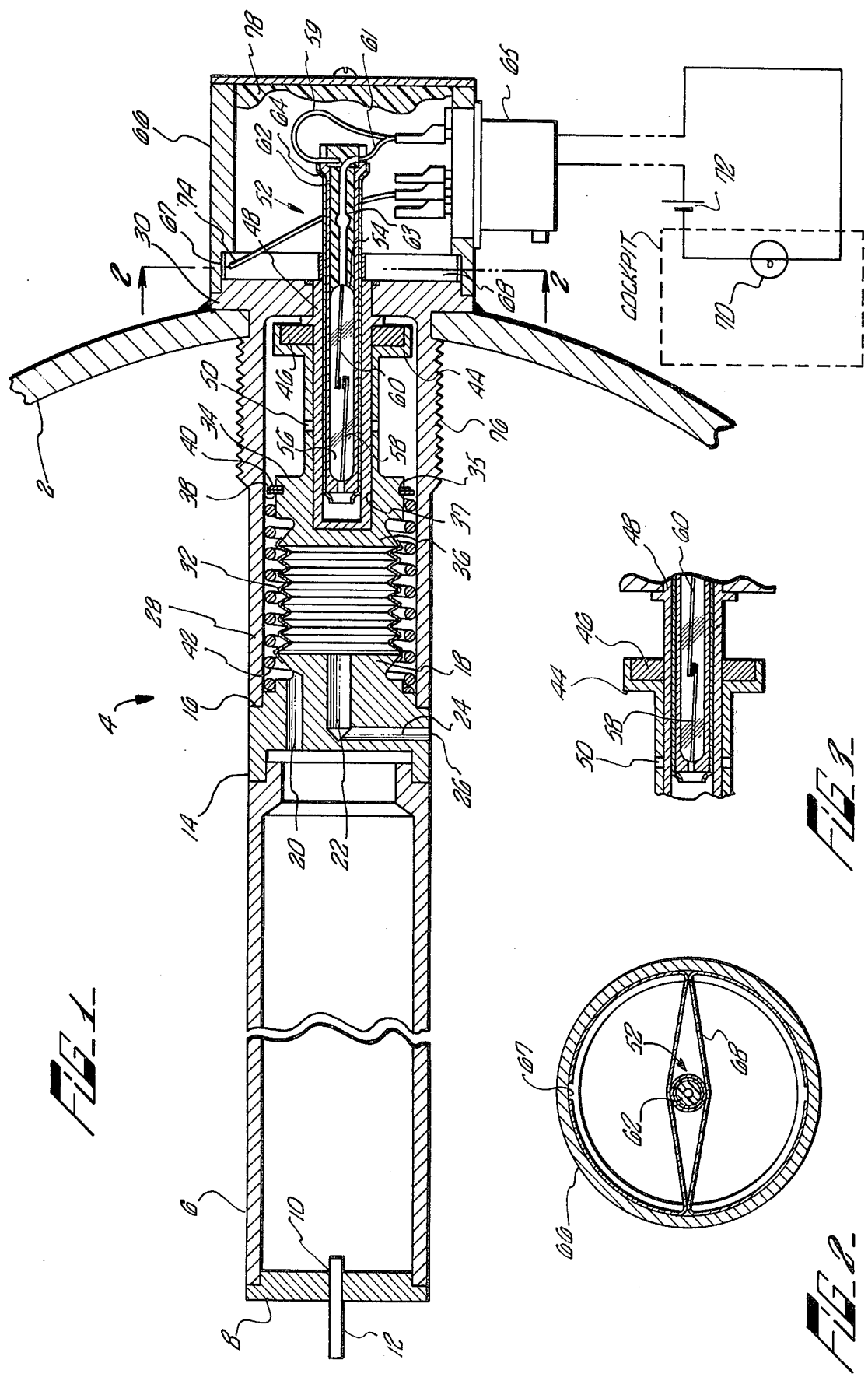

MAGNETIC PRESSURE INDICATOR FOR A CONTAINER

BACKGROUND OF THE INVENTION

1. Field of the Invention

The present invention is directed to apparatus for measuring leakage of fluids from a closed container and more particularly to a temperature compensated pressure indicator adapted to be mounted within a pressurized container.

2. Description of the Prior Art

A large number of applications utilizing a closed vessel or a pressurized container require an indication of the pressure level within the container. Frequently, these vessels or containers are employed to maintain a relatively high pressure; e.g., 7000 psi over a long period of time and are subject to sudden temperature changes. For example, in the field of fire extinguishers, it is quite common to utilize a conventional fire extinguisher having a pressure of about 600 psi or greater that can be subject to losses of pressure due to leakages of the fluid in the container. Other applications exist in a large number of fields such as monitoring floatation and impact bags in aircraft and other vehicles. Such leakages may occur due, for example, to accidental droppage of the container by a maintenance man or for numerous other reasons. Such a container may be rendered useless if its fire extinguishing fluid leaks appreciably. If the fire extinguisher containers are utilized, for example, in aircraft or other vehicles, it is quite apparent that a hazardous condition can develop on account of such leakage.

Other sources of leakage from a container may be due to microscopic openings in the metal from which the container is made, flaws in the welding material which are not readily detectable, fatigue of the material of the container because of the stresses and strains, and numerous other factors. Any or all these factors may be coexistent and may materially effect adversely the operativeness and utility of the container for its primary and essential functions.

One particular leakage indicator for fire extinguishers is shown in U.S. Pat. No. 3,735,376 issued on May 22, 1973, and assigned to the assignee of the present application. The device of the U.S. Pat. No. 3,735,376 provided a temperature compensation alarm mechanism for a fire extinguisher suitable for use on aircraft or other vehicles.

The mechanism included in addition to the main container, a miniaturized container which was inserted into the main container and was effectively separated by a diaphragm between the two containers. The diaphragm was responsive to a predetermined droppage in pressure of the main container to produce a signal indicative that the fire extinguisher was leaking. Since both the miniature container and the main container were filled with fluids having similar pressure temperature responses, the device was essentially temperature independent.

This device solved the problem of providing apparatus that could automatically determine a leakage or inoperative condition in a fire extinguisher or other pressure containers. The arrangement could serve to inform the staff of an aircraft that a defective condition had developed and in commercial use, the staff of the aircraft could signal the nearest landing field that the fire extinguisher may need prompt replacement or repair.

Other forms of pressure sensor devices have existed in the patents of the prior art such as the U.S. Pat. No. 3,576,412 issued Apr. 27, 1971. Problems existed in these devices of the prior art; for example, it was difficult to calibrate the pressure sensitivity and further to determine the operativeness of the switching mechanism of the leakage detector when it was installed or after a prolonged period in service. In addition, most prior art switches added an additional failure component to the pressure system and provide a thermal lag factor when subject to sudden temperature changes.

SUMMARY OF THE INVENTION

The present invention is directed to a pressure indicator having a primary pressure chamber connected to a source of pressure and a hermetically sealed secondary pressure chamber housing wall formed from a high thermal conductive material. A metal bellows member formed of welded rings connects the primary and secondary pressure chambers and is responsive to their pressure differentials. Attached to the bellows member is a movable member capable of generating a magnetic force field. Switch means are responsive to a predetermined positioning or strength of the magnetic force field for providing an output signal representative of the pressure differential. The pressure indicator can be temperature compensated by providing the sealed secondary pressure chamber with a fluid having substantially the same temperature-pressure characteristic as the fluid in the primary pressure chamber.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS:

FIG. 1 is a cross sectional view of the present invention installed within a pressurized container;

FIG. 2 is a plan view of the present invention taken along lines 2—2 of FIG. 1; and FIG. 3 is a partial cross sectional view of the switch assembly of the present invention.

DESCRIPTION OF THE PREFERRED EMBODIMENT

Referring to FIG. 1 of the drawings, a container 2 can be a conventional pressurized tank such as a fire extinguisher which may, for example, embody an elliptical, spherical or cylindrical metal housing and is frequently 4 to 20 inches in diameter and of any length. If the fire extinguisher tank 2 is to be mounted alone or in series adjacent an aircraft engine, it will frequently be spherical and subject to relatively high pressures. It should be understood that the present invention is not limited to the environment of fire extinguishers but is rather being described in this environment as one practical application of the present invention. Exemplary of other applications are impact and floatation pressure containers that can experience pressures of 10,000 psi or greater and sudden temperature changes of several hundred degrees Fahrenheit.

Tank 2 may contain a quantity of fire extinguishing fluid, such as freon 1301, and a quantity of nitrogen gas as a pressurizing fluid. Frequently, a tracer gas such as helium will be added to the tank 2. The temperature compensated pressure indicator 4 of the present invention includes a reservoir housing member 6 closed at one end by a cap end 8. While not shown, it is common to utilize a bushing for mounting the indicator 4 in the tank 2. The cap end 8 and the reservoir housing 6 are appropriately welded or brazed together and can be made from a material such as stainless steel or beryllium copper. The use of a material such as beryllium copper is important, particularly in applications that are subject to rapid temperature changes, since it has a relatively high thermal conductivity characteristic. Thus, any fluid within the reservoir housing member 6 will experience the same temperature range as the exterior fluid without any appreciable temperature lag, even during temperature rate of changes of 150°F per minute. The cap end 8 contains a centrally located bore 10 that is adapted to accommodate a capillary tube 12. Appropriate pressurizing fluid can be inserted into the cavity of the housing member 6 through the capillary tube 12. The capillary tube 12 can be closed or sealed by any appropriate method such as crimping and welding. Frequently, the indicator 4 will be calibrated by monitoring the pressure of the fluid applied through the capillary tube 12.

At the other end of the reservoir housing 6, a bellows plate 14 is affixed by any appropriate means that insures a fluid tight connection. The bellows plate 14 includes a series of concentric shoulders 16 terminating in an annular cone shape end 18. At the base of the cone end 18 is a plurality of ports 20 that communicate through straight passages that extend through the bellows plate 14 to provide fluid communication with the reservoir housing 6. The number of ports 20 are a matter of design, and can include seven ports located at 45 degree positions about the center of the bellows plate 14.

In the center of the bellows plate 14 is a port 22 which communicates through an L-shape passage 24 to extend to an opening 26 on one side of the bellows plate 14. Welded on the first shoulder of the bellows plate 6 is a housing 28 which terminates at the other end in an enlarged flange 30. The housing 28 has a threaded outside surface 76 which can be utilized in alternative mounting arrangements with tanks.

Appropriately welded to the cone end 18 of the bellows plate 14 is a bellows 32 which can be made of a stainless steel that is heat treated and is relatively thin. Generally, the bellows 32 will include a series of rings that are welded together. The illustration of the bellows 32 in FIG. 1 is essentially schematical. Alternatively, the bellows 32 may be any impermeable flexible diaphragm readily responding to relatively small pressure differentials of the fluids on either side of the diaphragm; e.g., 100 psi in a 7000 psi pressure system and capable of withstanding the applied pressure during operation. A magnetic post member 34 has a cone end 36 which is likewise welded to the bellows 32.

A peripheral groove 35 on the surface of the magnetic post member 34 is adapted to receive a washer 38 and a retaining ring 40. The retaining ring 40 serves as one seat for a helical, circular cross section spring 42. Another shoulder 16 on the bellows plate 14 serves as the other seat for the spring 42. The spring 42 not only places the bellows 32 in a slight tension, it further is designed with an inside coil diameter that prevents a bellows expansion that could damage the bellows 32.

The other end of the magnetic post member 34 includes an enlarged cylindrical flange 44 with a peripheral lip which supports a magnetic ring 46 made from a material such as Alnico-8.

Alternatively, an electro-magnetic coil (not shown) may be mounted on the post member 34. For the purposes of the present invention, it is only necessary to provide a device capable of generating a magnetic force field. Likewise, other switch mechanisms (not shown) responsive to a predetermined magnetic force field could be utilized.

The magnetic post member 34 has a hollow bore 37 and is adapted to slide over a post guide 48 which has been welded so that it is cantilevered from the housing flange 30 into the housing 28. Bleed ports 50 are provided in the central portion of the magnetic post member 34 to prevent any fluid or pressure locking between the post guide 48 and the magnetic post member 34. The bleed ports 50 insure a free relative movement of the magnetic post member 34 over the post guide 48. The end of the post guide 48 serves the further function of providing a positive safety stop or limit to the movement of the magnetic post member 34; e.g., reservoir housing cavity was not pressurized.

The post guide 48 has a hollow, circular configuration for receiving a reed switch assembly 52. The reed switch assembly 52 includes a reed switch 54 having a cylindrical glass envelope 56 and a pair of magnetizable electrodes 58 and 60 that are cantilevered into the interior of the glass envelope 56 and extend outward of the respective ends of the glass envelope 56. Mounted over the reed switch 54 is an electrically conductive sleeve member 62 made from a material such as brass. The outwardly extending portion of electrode 58 is affixed with solder to the brass sleeve member 62. Electrode 60 is attached to a wire 61 and electrically insulated from the brass sleeve by shrink tubing. An epoxy 63 is introduced into the brass sleeve 62 to isolate the reed switch electrode 60 from the brass sleeve 62.

An insulating tubing 64 that can be made from a polyvinylidedene fluoride or irridated polyvinyl chloride is shrink mounted over the brass sleeve member 62. The insulating tubing 64 electrically insulates the sleeve member 62 from both the post guide 48 and the other components of the temperature compensation indicator 4.

A terminal house 66 can be mounted on the housing flange 30 with an undercut groove 67 adjacent the housing flange 30 for positioning a pair of band springs 68. The band springs 68 are independently mounted in the groove 67 and are adapted to hold the reed switch assembly 52 in an operative fixed position while at the same time permitting, if desired, movement of the reed switch assembly 52 into and out of the housing 28 for calibration of its pressure sensitivity.

The reed switch 54 is connected to an appropriate electrical circuit schematically shown which may include a visual and/or audible indicator (not shown) such as a lamp 70 that may be mounted in the cockpit of a vehicle or airplane. The electrodes 58 and 60 can be connected to the circuit by appropriate lead wires 59 and 61 that are ultimately connected to a plug 65. The circuit may be powered by any source of voltage such as a battery 72 or any common DC or AC source. An additional ground connection such as the terminal wire 74 may be optionally provided to help eliminate any electrical interference so that a computerized monitoring operating can be employed.

The interior of the housing 28 along with the cavity of the reservoir housing 6 forms a secondary pressure chamber for the temperature compensated pressure indicator 4. The interior of the bellows 32 communicates with the pressure within the tank 2 through the passage 24 to form a primary pressure chamber. An equilibrium force equation would basically balance the force of the spring 42 and the primary chamber pressure force exerted on the magnetic post member cone end 36 against the secondary chamber pressure force exerted on the magnetic post member cone end 36. Generally, the spring 42 is maintained in tension during normal operation since the pressure force of the primary pressure chamber is usually greater or at least equal to that of the secondary pressure chamber.

Quite frequently, in a fire extinguisher application, the charging fluids within both the secondary chamber and the primary chamber will be substantially identical fluid components; namely, freon 1301 and nitrogen gas, in the same general proportions. This insures that temperature variations will not effect the operation of the indicator 4. Actually, fluidic components that generate the same pressure temperature response over the operative range of the indicator 4 would be acceptable, particularly in applications outside of the fire extinguishing field. It should, however, be realized that the advantages of the present invention are not limited to this temperature compensation function since the unique construction of the present apparatus can be simply used as a pressure indicator. For example, the present invention is capable of monitoring continuously and promptly any substantial deviation in the pressure of the primary chamber. The bellows 32 is hermetically sealed, for example, by welding or brazing to completely isolate the relative fluids in the primary and secondary chamber. Furthermore, the bellows 32 is so oriented that it can be flexed many times in testing or otherwise during operation of the equipment without substantially effecting its long range durability and operability. In particular, the spring 42 is positioned so that after a predetermined travel, its respective coils will close on each other and prevent any permanent deformation of the bellows 32. This arrangement provides a fail-safe construction in case the pressure within the primary chamber is lost, for example, due to leakages, etc.

If desired, the primary and secondary chambers of the leakage indicator 4 can be coupled to different containers. In such an arrangement, the fluids of both containers will be kept apart by the bellows 32 and the fluids would normally apply pressure against the opposite side of the magnetic post member 34. Variations in the respective pressures in the containers will activate the reed switch assembly 52.

Since both the primary and secondary chambers will be subjected to approximately the same ambient temperatures, particularly with the use of high thermal conductivity material, the relative pressures will be approximately the same. For example, a container filled with substantially identical fluid components, namely freon 1301 and nitrogen gas of the same general proportions, at a pressure of 600 psi at 68°F will drop to approximately 180 psi at a minus 65°F. In that event, the bellows 32 will remain essentially undeflected and the reed switch assembly 52 will remain inactive. Accordingly, the signal circuit will not activate the lamp 70.

In operation, the secondary chamber is filled with a reference fluid which is frequently of the same or substantially identical fluid components as that of the primary chamber. When the pressure in the primary chamber is lost, for example, due to leakage, the bellows 32 will retract towards the bellows plate 14. The magnetic post member 34 that is firmly attached to the bellows 32 and its attached magnet 46 will likewise be moved a corresponding distance. The reed switch assembly 52 remains relatively stationary within the post guide 48. When the magnet 46 reaches a predetermined position or magnetic field strength relative to the electrodes such as shown in FIG. 3, the magnetic flux or force field of the magnet 46 will drive the respective centilevered electrodes 58 and 60 together to close the electrical circuit and activate a signal device such as lamp 70. When the magnet 46 is removed from the predetermined position relative to the electrodes 58 and 60, the spring force of the respective electrodes will separate them and open the electrical circuit as shown in FIG. 1. Obviously, the same result can be achieved by positioning the magnet 46, or some other device capable of generating a magnetic field, to maintain a closed electrode position during a balanced pressure state with leakage being indicated when the circuit is opened.

The calibration of the indicator 4 in a tank 2 can be accomplished with a number of variables, such as, the pressure of tank 2 can be monitored independently, the pressure of the secondary chamber can be monitored or the exact position of the contact point of the reed switch assembly 52 can be adjusted by moving the switch assembly 52 within the guide post 48. Thus, for a given pressure in the primary and secondary chambers, the sensitivity of the indicator 4 can be adjusted by movement of the switch assembly 52.

Generally, an epoxy 78 such as General Electric Co. RTV silicone compound will be applied to fill the terminal housing 66 to hold the switch assembly 52 in position after calibration.

An important advantage of the present invention is that the operativeness of the reed switch assembly 52 and the electrical circuit can be tested with a minimum of effort and equipment. For example, the application of a very strong magnetic field to the reed switch assembly 52 while the indicator 4 is within the tank 2 can cause the electrodes 58 and 60 to contact and thereby test the system. A simple but strong bar magnet (not shown) could be utilized for testing purposes by placing it adjacent the tank 2 near the indicator 4.

Also, if the reed switch assembly 52 is found to be inoperative, a new one can be simply installed within the guide post 48 without losing the entire leakage indicator 4. Finally, if the bellows 32 of the indicator 4 fails or ruptures, the pressure system is still operable.

It should be noted that various modifications can be made to the apparatus while still remaining within the purview of the following claims.

What is claimed is:

1. In a pressurized fluid container system subject to temperature variations having a temperature compensated pressure indicator for determining any fluidic leaks from a pressurized storage container of a first fluid such as fire extinguisher fluid in an aircraft and a primary pressure chamber connected to the first fluid pressure in the storage container, the improvement comprising:

a housing having a secondary pressure chamber adjacent the primary pressure chamber and containing a quantity of a second fluid having substantially the same pressure temperature response characteristics as the first fluid in the storage container, the secondary pressure chamber housing primarily formed from a material having a high thermal conductivity capable of transmitting thermal changes in the first fluid of approximately 150°F per minute to the second fluid within the secondary pressure chamber whereby the pressure temperature response characteristics of both fluids will be substantially the same;

a movable metal bellows formed of welded metal rings sealed in the housing between the primary and secondary pressure chambers and repetitively responsive to their relative pressure changes throughout a temperature range of at least 68°F to a minus 65°F;

a magnetic member operatively connected to the metal bellows; and switch means operatively controlled by the movement of said magnetic member and fluidically isolated from the primary and secondary pressure chambers, including a hollow guide post member attached to the housing and a relatively movable and replaceable switch assembly positioned within the hollow guide post member, the switch assembly including a pair of cantilevered electrodes, the switch means responsive to a predetermined strength of the magnetic force field for moving the cantilevered electrodes to provide a signal representative of any pressure differential in the primary and secondary pressure chambers indicating a leak in the storage container, wherein the metal bellows connected between the primary and secondary pressure chambers includes a post member movably mounted around the guide post member.

2. The invention of claim 1 further comprising a safety means for preventing a destructive deformation of the bellows member including a spring encircling and biasing the bellows member towards an expanded position.

3. The invention of claim 1 wherein the magnetic member is mounted on the post member.

4. The invention of claim 3 wherein a secondary pressure chamber wall is primarily formed from beryllium copper.

5. The invention of claim 1 further including safety means operatively contacting the metal bellows for preventing any deformational movement of the metal bellows.

* * * * *